No. 682,396. Patented Sept. 10, 1901.
G. W. WELLS.
SPECTACLE OR EYEGLASS CASE.
(Application filed Mar. 28, 1900.)
(No Model.)
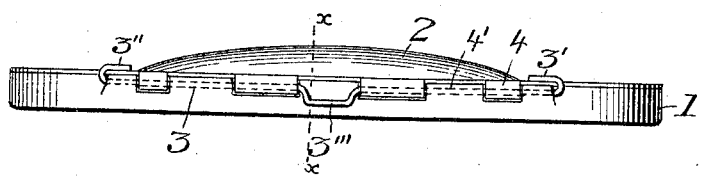
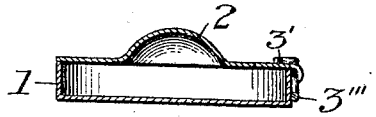
Witnesses:
D. W. Edelin.
A. Harveycutter
Inventor:
Geo. W. Wells.
By Robt P. Hains
Atty.

UNITED STATES PATENT OFFICE.

GEORGE W. WELLS, OF SOUTHBRIDGE, MASSACHUSETTS.

SPECTACLE OR EYEGLASS CASE.

SPECIFICATION forming part of Letters Patent No. 682,396, dated September 10, 1901.

Application filed March 28, 1900. Serial No. 10,454. (No model.)

*To all whom it may concern:*

Be it known that I, GEORGE W. WELLS, a citizen of the United States, residing at Southbridge, in the county of Worcester and State of Massachusetts, have invented certain new and useful Improvements in Spectacle or Eyeglass Cases, of which the following is a specification.

My invention relates to spectacle or eyeglass cases; and the object of my invention is to provide an improved spectacle and eyeglass case having a spring-actuated lid or cover which must be held open against the action of the spring, but is closed and held closed by the action of the spring.

My invention consists in certain novel features of construction of my improved spectacle or eyeglass case, as will be hereinafter fully described.

Referring to the drawings, Figure 1 is a side elevation of a spectacle or eyeglass case embodying my invention; and Fig. 2 is a cross-sectional view thereof on the line $x\,x$, Fig. 1.

In the accompanying drawings the spectacle or eyeglass case shown is preferably made of metal, which may be covered with leather in the ordinary way, and consists of the body portion 1, which may be of the shape shown in the drawings, adapted to hold spectacles or eyeglasses. The lid or cover 2 is hinged at one edge to one edge of the body 1 of the case and is preferably made convexed outwardly, as shown, to furnish a space for offset nose-guards now ordinarily used on eyeglasses. In connection with the body 1 of the case and the lid or cover 2 I employ a spring 3, which acts to close and hold closed the lid or cover, but does not act to hold it open.

In the form of device shown as embodying my present invention the body 1 and cover 2 are each provided with bent portions 4 4', through which passes the spring 3, which thus acts also as the pintle of the hinge connecting the body and cover. The spring 3, which is of less length than the body and lid, at each end is bent back upon itself, as shown at 3' 3'', and such portion of the spring rests upon the top of the lid. Between the bent ends 3' 3'' of the spring 3 there is a bent portion 3''', preferably, though not necessarily, midway between said ends, which bent portion bears against the exterior of the body portion. Thus between the action of the ends 3' 3'' upon the lid and the part 3''' upon the body of the case the lid 2 is normally held closed, and the spring 3 acts not only to close the lid after it has been opened, but to hold it closed.

The advantages of my improvements will be readily appreciated by those skilled in the art. I provide a spectacle or eyeglass case with a spring-actuated self-closing lid or cover which is of very simple and inexpensive construction and in which the rod or pintle of the hinge-joint of the case may act as the spring to close and hold closed the lid or cover.

It will be understood that the details of construction of my improvements may be varied, if desired, and different forms of spectacle and eyeglass cases may be used.

Having thus described my invention, what I claim as new, and desire to secure by Letters Patent, is—

As an article of manufacture, a spectacle or eyeglass case consisting of a body and a lid convexed outwardly, each provided with joining portions, a rod or pintle connecting the joining portions of the body and lid and extending less than the length of the body and lid portions, said rod or pintle having its central portion bent to form a loop to bear upon the outside of the body and its opposite ends bent toward each other to bear upon the outside of the lid to thereby normally close and hold closed the lid.

GEORGE W. WELLS.

Witnesses:
J. C. WELLS,
E. E. SABIN.